June 4, 1968
R. M. QUINN
3,386,575
INSPECTION SYSTEM FOR MULTI-STATION INSPECTION APPARATUS
Filed April 18, 1966
3 Sheets-Sheet 1
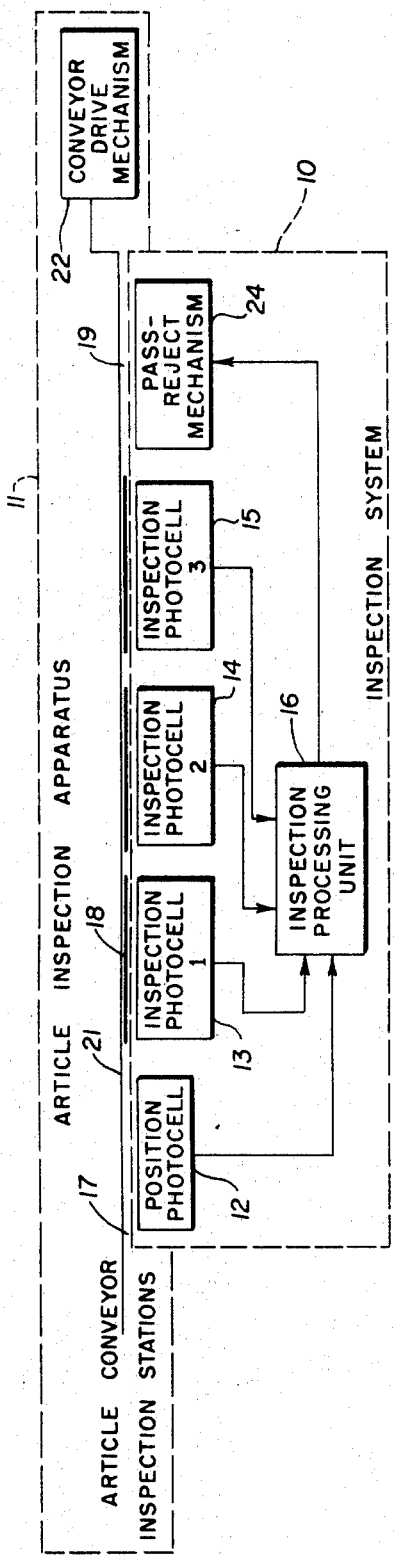
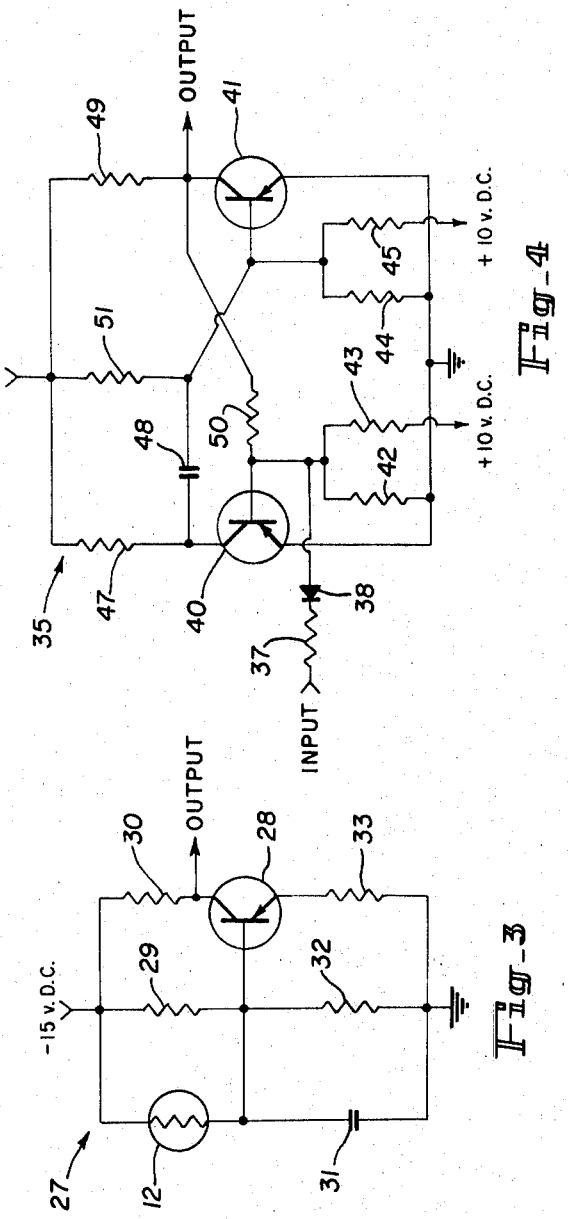
INVENTOR.
RICHARD M. QUINN
BY
*Campbell & Harris*
ATTORNEYS

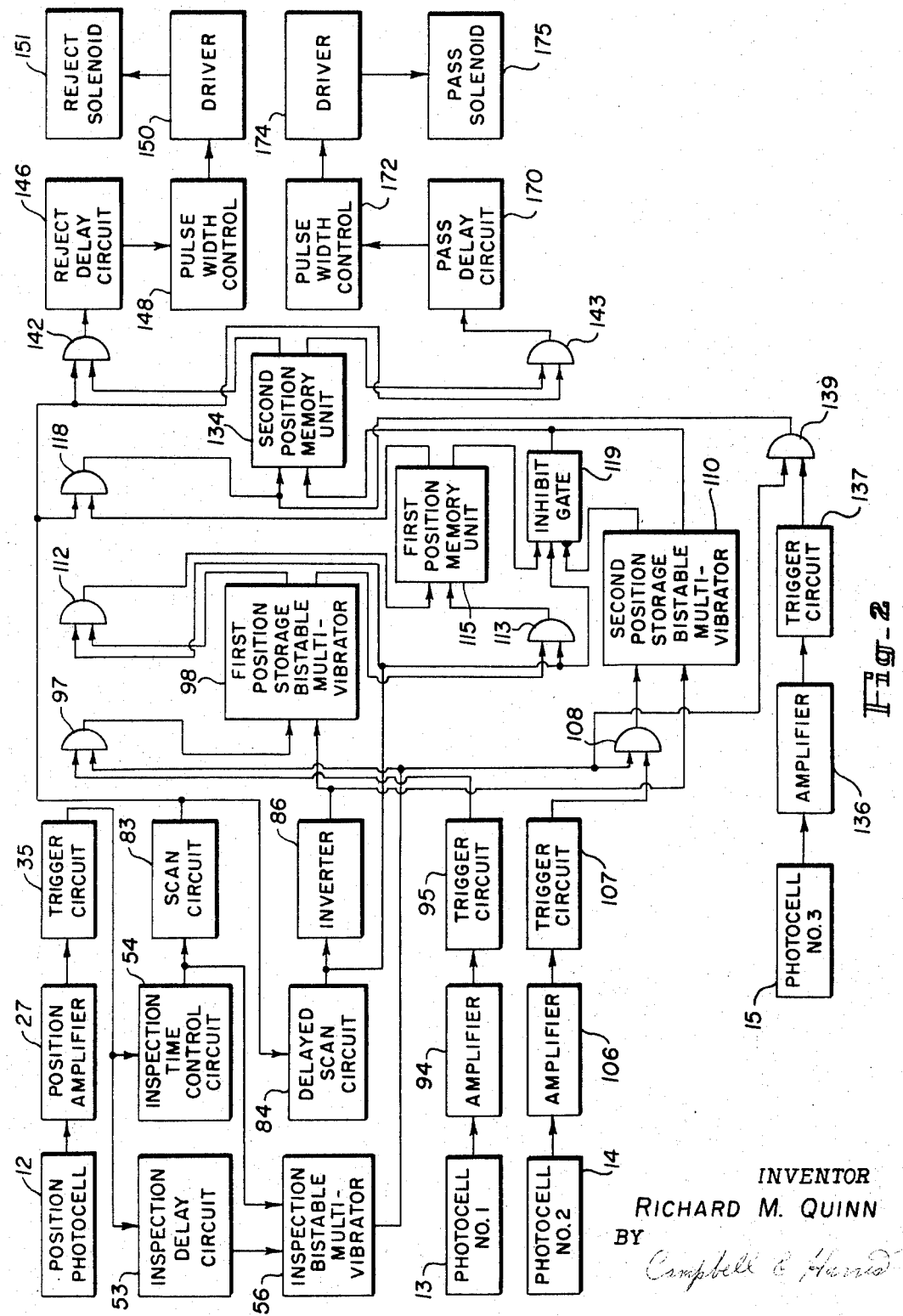

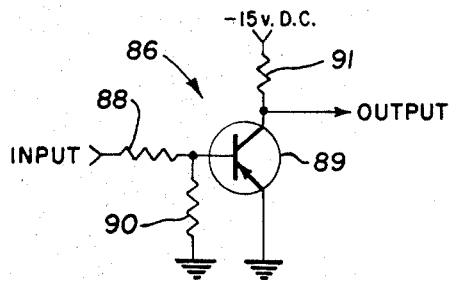
Fig_5
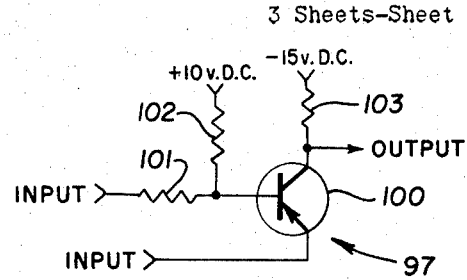
Fig_6
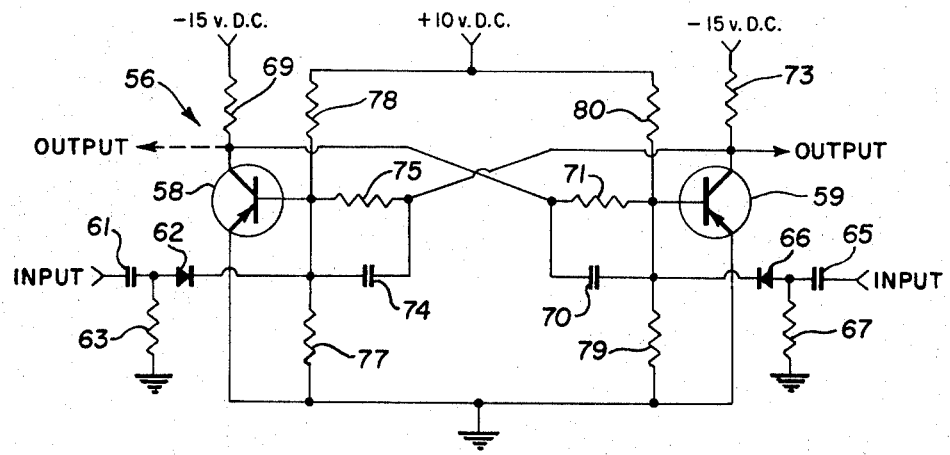
Fig_7
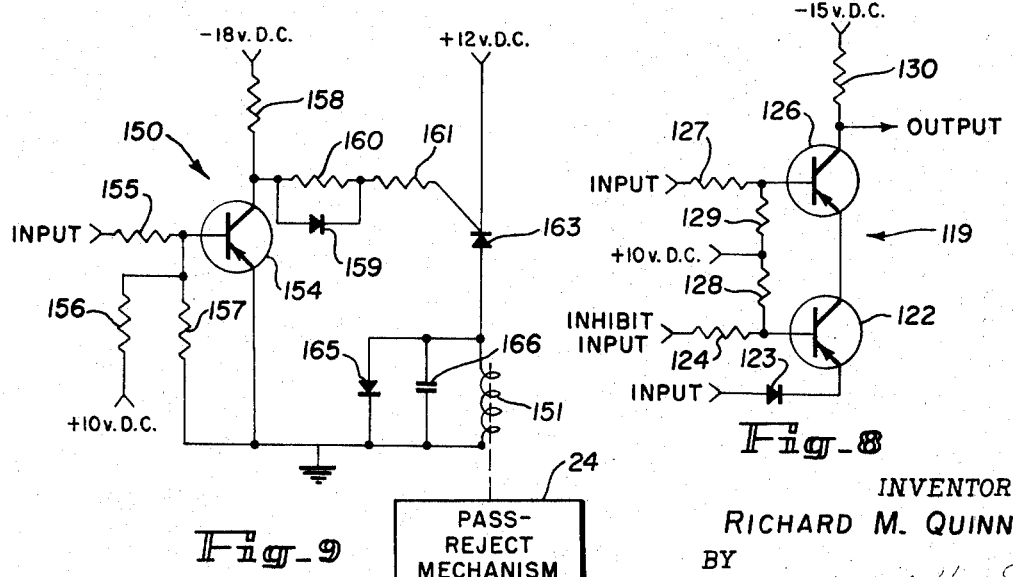
Fig_9    Fig_8
INVENTOR
RICHARD M. QUINN
BY
Campbell & Harris
ATTORNEYS

United States Patent Office 3,386,575
Patented June 4, 1968

3,386,575
INSPECTION SYSTEM FOR MULTI-STATION INSPECTION APPARATUS
Richard M. Quinn, Muncie, Ind., assignor to Ball Brothers Company Incorporated, Muncie, Ind., a corporation of Indiana
Filed Apr. 18, 1966, Ser. No. 543,296
8 Claims. (Cl. 209—75)

This invention relates to an electronic inspection system and, more particularly, to an electronic inspection system for apparatus having a plurality of inspection stations.

It is oftentimes desirable to inspect articles for a plurality of possible defects. Such is the case, for example, where glass bottles or jars must be inspected for several possible defects, such as, for example, defective sealing surfaces, blisters, checks and the like. While each inspection has sometimes been made independently, it has been found to be desirable to automatically conduct a series of inspections at a plurality of inspection stations and provide a memory system to reject the article if a defect is found at any one of said inspection stations.

While an electronic memory unit has been suggested heretofore for use in conjunction with a single stage inspection unit, and while various mechanical, electromechanical and magnetic memory devices have been heretofore proposed and utilized in conjunction with multistation inspection units, no completely acceptable electronic memory system capable of use with multi-station inspection apparatus has heretofore been known and utilized.

It is therefore an object of this invention to provide an electronic inspection system for multi-station inspection devices that is relatively simple yet efficient.

It is another object of this invention to provide an electronic inspection system for multi-station inspection apparatus having electronic memory means for receiving inspection information from all inspection stations and responsive thereto rejecting articles found defective at any of said stations.

It is still another object of this invention to provide an electronic inspection system for apparatus having a plurality of inspection stations which is capable of storing information with respect to a fault or a no-fault condition for each article inspected at each inspection station and acting on the accumulated information to reject the article after all inspections have been completed if found defective at any of said inspection stations.

It is another object of this invention to provide an electronic inspection system having a plurality of bistable memory units and means for stepping the information between said units so that information relating to article defects are cumulatively stored for use after the last inspection of each article has been completed.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the hereindisclosed invention are meant to be included as come within the scope of the claims.

The accompanying drawings illustrate one complete embodiment of the invention according to the best mode so far devised for the practical application of the principles thereof, and in which:

FIGURE 1 is a schematic and block diagram illustrating the electronic inspection system of this invention utilized with article inspection apparatus having a plurality of inspection stations;

FIGURE 2 is a block diagram of the electronic inspection system of this invention;

FIGURE 3 is a schematic diagram of a photocell and amplifier used in the inspection processing unit of this invention;

FIGURE 4 is a schematic diagram illustrating a monostable multivibrator utilized in the inspection processing unit of this invention;

FIGURE 5 is a schematic diagram illustrating an inverter used in the inspection processing unit of this invention;

FIGURE 6 is a schematic diagram of an AND circuit used in the inspection processing unit of this invention;

FIGURE 7 is a schematic diagram illustrating a bistable multivibrator used in the inspection processing unit of this invention;

FIGURE 8 is a schematic diagram illustrating an INHIBIT gate used in the insepction processing unit of this invention; and FIGURE 9 is a schematic diagram illustrating the driver and solenoid used in the inspection processing unit of this invention to energize the pass-reject mechanism.

Referring now to the drawings, the numeral 10 refers generally to the electronic inspection system of this invention shown in FIGURE 1 in conjunction with article inspection apparatus 11. As shown in FIGURE 1, inspection system 10 includes a position photocell 12, first, second, and third inspection photocells 13, 14, and 15, respectively, connected to inspection processing unit 16.

As indicated schematically in FIGURE 1, the electronic inspection system of this invention is contemplated for use with article inspection apparatus having an entrance point 17, a plurality of inspection stations designated generally by the numeral 18, and an exit point 19. Each article to be inspected is conveyed by article conveyor 21, which conveyor is driven by a conveyor drive mechanism 22, so that the articles are successively presented at each inspection station prior to reaching exit point 19. Conveyor drive mechanism 22 is preferably an intermittent drive, but other drives can be used as necessity dictates.

As shown in FIGURE 1, an inspection photocell is associated with each inspection station 18, and position photocell 12 is positioned in front of the first station to sense article transfer from station to station. Inspection processing unit 16 is connected to the various photocells and processes information therefrom to control the position of pass-reject mechanism 24 so that the article is rejected as it leaves the last inspection station if defective and passed if not defective.

Inspection system 10 is shown in block form in FIGURE 2 of the drawings, where, with the exception of the four photocells shown, the remainder of the diagram is inspection processing unit 16. The four photocells are positioned so that a light source (not shown) passes through or is reflected by the article as is well known in the photocell and article inspection arts.

As shown in FIGURE 2, information sensed by each inspection photocell is processed in inspection processing unit 16, which includes transferring the information between memory units and other storage multivibrators so that information as to each inspection is accumulated at the last memory unit for passing or rejecting the inspected article as it leaves the inspection apparatus. To provide for inspection information transfer at the proper time, position photocell 12 senses an article transfer from station to station and develops a pulse when transfer occurs, which pulse is coupled to position amplifier 27.

Position amplifier 27 is shown schematically in FIGURE 3 of the drawings. As shown in FIGURE 3, photocell 12 is connected to the base of PNP type transistor 28 and has its other end connected to a −15 volt D.C. power supply (not shown). In addition, the base of transistor 28 is connected to the −15 volt D.C. power supply (not shown) through resistor 29, the collector of transistor 28 is connected to the −15 volt D.C. power supply (not shown) through resistor 30, the base of transistor 28 is also connected to ground through parallel connected capacitor 31 and resistor 32, and the emitter of transistor 28 is connected to ground through resistor 33. When an article passes between or breaks the light beam (from a conventional light source as is well known in the photocell art) to photocell 14, a pulse is generated which is coupled to the base of transistor 28 and the amplified output taken from the collector of transistor 28.

As shown in FIGURE 2, the output pulse from position amplifier 27 is coupled to trigger circuit 35, which circuit is a monostable multivibrator and is shown in schematic form in FIGURE 4 of the drawings. As shown in FIGURE 4, the input pulse is coupled through series connected resistor 37 and diode 38 to the base of PNP type transistor 40.

Multivibrator 35 includes two transistors 40 and 41 of the PNP type, both of which have grounded emitters. The base of transistor 40 is connected to the junction of serially connected resistors 42 and 43, which resistors form a voltage divider between ground and a +10 volt D.C. power supply (not shown). In like manner, the base of transistor 41 is connected to the junction of serially connected resistors 44 and 45, which resistors, likewise, form a voltage divider between ground and the +10 volt D.C. power supply (not shown). The collector of transistor 40 is connected to a −15 volt D.C. power supply (not shown) through resistor 47 and to the base of transistor 41 through charging capacitor 48, while the collector of transistor 41 is connected to the −15 volt D.C. power supply (not shown) through resistor 49 and to the base of transistor 40 through resistor 50. In addition, the base of transistor 41 is connected to the −15 volt D.C. power supply through resistor 51 and the output from the multivibrator is taken from the collector of transistor 41.

In operation, monostable multivibrator 35 operates in conventional fashion with transistor 41 being normally conductive and transistor 40 being normally nonconductive. When a negative polarity pulse is coupled to the base of transistor 40 to render the same conductive, transistor 41 will be cut off since its base is tied to the collector of transistor 40 through capacitor 48. However, as capacitor 48 charges, transistor 41 will again start to conduct, and since its collector is tied to the base of transistor 40 through resistor 50, transistor 40 will be cut off and will thereafter remain in a nonconductive state until a new input pulse is received to again trigger transistor 40 to conduction.

As shown in FIGURE 2, the output from trigger circuit 35 is coupled to inspection delay circuit 53 and inspection time control circuit 54, both of which are monostable multivibrators similar to trigger circuit 35, as shown in FIGURE 4, with the exceptions that the input from trigger circuit 35 to both inspection delay circuit 53 and inspection time control circuit 54 is coupled through a capacitor (not shown) (rather than the resistor and diode as shown in FIGURE 4) to the base of the normally conducting transistor (i.e., the transistor comparable to transistor 41 as shown in FIGURE 4), and the resistor between the base of the normally conductive transistor and the −15 volt D.C. power supply is a variable resistor for adjustment purposes. By this arrangement the trailing edge of the incoming pulse is utilized to trigger the multivibrator.

The output from inspection delay circuit 53 is coupled to one side of inspection bistable multivibrator 56. Inspection bistable multivibrator 56 is shown in schematic form in FIGURE 7 of the drawings. As shown in FIGURE 7, the bistable multivibrator includes a pair of PNP type transistors 58 and 59, both of which have grounded emitters. The input pulse coupled to one side of the bistable multivibrator (from inspection delay circuit 53) is coupled to the base of transistor 58 through coupling capacitor 61 and diode 62, the junction of which has a resistor to ground. In like manner, the other input to the multivibrator is coupled through coupling capacitor 65 and diode 66, the junction of which has a resistor 67 to ground. With this arrangement, the trailing edge of the incoming pulse causes the multivibrator to change state.

The collector of transistor 58 is connected to the −15 volt D.C. power supply (not shown) through resistor 69 and to the base of transistor 59 through parallel connected capacitor 70 and resistor 71. In like manner, the collector of transistor 59 is connected to the −15 volt D.C. power supply (not shown) through resistor 73 and to the base of transistor 58 through parallel connected capacitor 74 and resistor 75. The base of transistor 58 is connected to the junction of serially connected resistors 77 and 78, which resistors form a voltage divider between the +10 volt D.C. power supply (not shown) and ground. In like manner, the base of transistor 59 is connected to the junction of serially connected resistors 79 and 80, which resistors are connected as a voltage divider between the +10 volt D.C. power supply (not shown) and ground.

In operation, bistable multivibrator 56 is conventional and will maintain its state until an output pulse is coupled to cause it to change states. Assuming, for example, that transistor 59 is conductive and transistor 58 is nonconductive, an input pulse of negative polarity coupled to the base of transistor 58 to cause the same to conduct will cause transistor 59 to be cut off since the collector of transistor 58 is connected to the base of transistor 59. In like manner, a negative polarity input pulse to the base of transistor 59 to cause it to conduct will cause transistor 58 to be cut off since the collector of transistor 59 is connected to the base of transistor 58. Since the multivibrator is thus bistable, the transistor that is conducting will hold the other transistor in a nonconductive state. The output from the bistable multivibrator is taken from the collector of transistor 59, as shown in FIGURE 7, but a second output could likewise be taken from the collector of transistor 58 if desired.

The output from inspection time control circuit 54 is coupled to scan circuit 83 and to the other side of inspection bistable multivibrator 56, and the trailing edge of the pulse is utilized to trigger the multivibrators. Scan circuit 83 is a monostable multivibrator similar to the multivibrator shown in FIGURE 4, except that the input is coupled through a coupling capacitor (not shown) (rather than through the resistor and diode, as shown in FIGURE 4), and the input is coupled to the normally conductive transistor rather than to the normally nonconductive transistor.

The output from scan circuit 83 is coupled to a delayed scan circuit 84, which circuit is a monostable multivibrator identical in structure to scan circuit 83, except that the input is coupled through both a coupling capacitor (not shown) and diode (not shown) positioned with the cathode connected to the capacitor and the anode connected to the base of the normally conductive transistor. In addition, a resistor (not shown) to ground is connected between the junction of the capacitor and diode. The outputs from scan circuit 83, delayed scan circuit 84, and inspection multivibrator 56 are used as the inputs to the various AND gates in the processing unit.

The output from delayed scan circuit 84 is also coupled to an inverter 86 for resetting the two storage multivibrators in the processing unit. Inverter 86 is shown in FIGURE 5, and as shown, the input is coupled through a resistor 88 to the base of transistor 89, which transistor is of the PNP type and has a grounded emitter. The base of transistor 89 is also connected to ground through a resistor 90 and the collector of transistor 89 is connected to the −15 volt D.C. power supply (not shown) through resistor 91. As is conventional, the output is taken from the collector so that the input signal is inverted by the transistor. The trailing edge of the pulse from the inverter is used to reset the two storage multivibrators in the processing unit.

While the article to be inspected is at the first inspection station, first inspection photocell 13 generates a pulse if there is a defect sensed. This pulse is coupled through amplifier 94 to trigger circuit 95, as shown in FIGURE 2. Amplifier 94 and trigger circuit 95 may be identical in structure to position amplifier 27 and trigger circuit 35, shown in FIGURES 3 and 4, however, in some cases, amplifier 94 may require conventional modification for additional gain.

The output from trigger circuit 95 is coupled to AND gate 97, a second input to the AND gate being provided from inspection bistable multivibrator 56 (which multivibrator is controlled by position photocell 12) so that the presence of a signal at both inputs causes an output from AND gate 97, the output being coupled to first position storage bistable multivibrator 98. First position storage multivibrator 98 is a bistable multivibrator and is identical in structure to inspection multivibrator 56, shown in FIGURE 7, except that the diodes are reversed at each input and outputs are taken from both collectors. AND gate 97 is shown in schematic form in FIGURE 6. As shown in FIGURE 6, the input from inspection bistable multivibrator 56 is coupled directly to the emitter of transistor 100, while the output from trigger circuit 95 is coupled to the base of transistor 100 through resistor 101. In addition, the base of transistor 100 is connected to the +10 volt D.C. power supply (not shown) through resistor 102, while the collector is connected to the —15 volt D.C. power supply (not shown) through resistor 103. The output is taken from the collector, as is conventional.

In like manner, when the article to be inspected is at the second inspection station, second inspection photocell 14 generates an output pulse if a defect is sensed. This pulse is coupled through amplifier 106 and trigger circuit 107 to AND gate 108. Amplifier 106, trigger circuit 107 and AND gate 108 are identical to amplifier 94, trigger 95, and AND gate 97, respectively. The second input to AND gate 108 is from inspection bistable multivibrator 56. Since this multivibrator is controlled by the position photocell 12, it can be seen that AND gate 108 is controlled, as is AND gate 97, by article transfer sensed by position photocell 12. The output from AND gate 108 is coupled to second storage bistable multivibrator 110, which multivibrator is identical to multivibrator 98.

The first output from first position storage multivibrator 98 is connect to AND gate 112, while the other output is connected to AND gate 113, which gates are identical in structure to AND gate 97. Both AND gates receive their second input from delayed scan circuit 84 so that the position storage bistable multivibrator information is transferred to first position memory unit 115 since, as shown in FIGURE 2, the outputs of AND gates 112 and 113 are connected to the opposite sides of first position memory unit 115, which multivibrator is identical in structure to bistable multivibrator 98. Thus, information is stored in first position storage multivibrator 98 during the inspection bistable multivibrator 56 pulse, and is then transferred to first position memory unit 115 when the delayed scan pulse from delayed scan circuit 84 later occurs.

The first output from first position memory unit 115 is connected to AND gate 118, while the other output is connected to INHIBIT gate 119. The second input to AND gate 118 is from scan circuit 83, while a second input to INHIBIT gate 119 is from delayed scan circuit 84. The third, or inhibiting, input to INHIBIT gate 119 is coupled thereto from the first output of second position storage bistable multivibrator 110.

INHIBIT gate 119 is shown schematically in FIGURE 8. As shown in FIGURE 8, the input from first position memory unit 115 is coupled to the emitter of transistor 122 through diode 123, while the inhibiting input is coupled to the base of transistor 122 through resistor 124. The collector of transistor 122 is directly connected to the emitter of transistor 126, and the base of transistor 126 receives the input from the delayed scan circuit 84 through resistor 127. In addition, the bases of transistors 122 and 126 are connected to the +10 volt D.C. power supply (not shown) through resistors 128 and 129, respectively, while the collector of transistor 126 is connected to the —15 volt D.C. power supply (not shown) through resistor 130, and the output from the INHIBIT circuit is taken from the collector of transistor 126. INHIBIT circuit 119 operates in conventional fashion so that in the absence of an inhibiting input, coincidence of pulses at the other two inputs will produce an output from the INHIBIT circuit.

The other output of second position storage bistable multivibrator 110 is connected to the output side of INHIBIT gate 119, so that both the output from INHIBIT gate 119 and the second output from bistable multivibrator 110 are connected to one input of second position memory unit 134, which unit is a bistable multivibrator identical in structure to bistable multivibrator 98, except that the input from second position bistable multivibrator 110 is coupled through a diode which is reversed with respect to the diode of bistable multivibrator 98 (the diode through which the INHIBIT gate output is coupled, however, is not reversed).

A second input to second position memory unit 134 is from AND gate 118, which input is also connected to receive an output from third inspection photocell 15 through amplifier 136 and trigger circuit 137, which are identical to amplifier 94 and trigger circuit 95. The output from trigger circuit 137 is coupled to AND gate 139, which AND gate is identical to AND gate 97, and receives a second input from the inspection bistable multivibrator 56. The output from AND gate 139 is coupled to second position memory unit 134 as stated hereinabove.

The first output from second position memory unit 134 is connected to AND gates 142 while the other output is connected to AND gate 143, which gates are identical in structure to AND gate 97 and receives a second input from scan circuit 83.

The output of AND gate 142 is coupled to reject delay circuit 146, which circuit is a monostatble multivibrator similar to monostable multivibrator 35, as shown in FIGURE 4, with the exceptions that the input is coupled through a capacitor (not shown), and the resistor connected to the base of the normally conducting transistor is variable for adjustment purposes. The output from reject delay circuit 146 is coupled to pulse width control circuit 148, which circuit is likewise a monostable multivibrator and is identical to the monostable multivibrator shown in FIGURE 4 except that the input is coupled through a coupling capacitor (not shown) to the base of the normally conducting transistor.

The output from pulse width control circuit 148 is coupled to a driver 150 which drives a reject solenoid 151 to reject defective articles. Driver 150 and reject solenoid 151 are shown in FIGURE 9. As shown in FIGURE 9, the input from pulse width control 148 is coupled to the base of transistor 154 through resistor 155. The base of transistor 154 is connected to the junction of serially connected resistors 156 and 157, which resistors form a voltage divider between the +10 volt D.C. power supply (not shown) and ground. The emitter of transistor 154 is grounded, while the collector is connected to the —18 volt D.C. power supply (not shown) through resistor 158. The output from the driver is taken from the collector through parallel connected diode 159 and resistor 160 and resistor 161 (connected in series with diode 159 and resistor 160) to silicon controlled rectifier 163. The other two elements of silicon controlled rectifier 163 are connected to the +12 volt D.C. power supply (not shown) and reject solenoid 151, which solenoid has connected in parallel therewith diode 165 and capacitor 166.

In like manner, the output from AND gate 143 (which indicates that the article is not defective) is coupled to pass delay circuit 170, which circuit is a monostable multivibrator identical in structure to reject delay circuit 146. The output from pass delay circuit 170 is coupled to pulse width control circuit 172, which is identical in structure to pulse width control cicruit 148, and the output from pulse width control 172 is coupled to driver 174, which driver has the same structure as driver 150 and is used to drive pass solenoid 175 in the same manner that driver 150 drives reject solenoid 151 shown in FIGURE 9.

In operation, when an article is conveyed to the first inspection station by article conveyor 21, position photocell 12 develops a pulse to indicate article transfer. The article is inspected at the first inspection station by first inspection photocell 13 and if found defective a pulse is coupled to AND gate 97. The pulse from position photocell 12 sets inspection bistable multivibrator 56 to provide an output to AND gate 97 (as well as AND gates 108 and 139) and the information is used to set first storage multivibrator 98 so that an output is coupled to AND gate 112 (to indicate a fault).

When the delayed scan circuit 84 pulse occurs (after the bistable multivibrator pulse), the state of storage multivibrator 98 is sensed since this pulse is coupled to AND gates 112 and 113. If there is a fault and therefore an output to AND gate 112 from storage multivibrator 98, first position memory circuit 115 is set to provide an output to AND gate 118. If there is no fault, however, and therefore an output from storage multivibrator 98 is coupled to AND gate 113, first position memory unit 115 is set so that an output is provided to INHIBIT gate 119.

When the article transfer then later again occurs, the output from inspection bistable multivibrator 56 is again coupled to AND gate 108 (as well as AND gates 97 and 139). If there is a defect sensed at the second position by second inspection photocell 14, an output pulse is coupled to AND gate 108 so that a pulse from this gate is supplied to second position storage multivibrator 110 to set the state of this multivibrator so that an output pulse is coupled to the inhibiting input of INHIBIT gate 119. If there is a defect sensed by second inspection photocell 14 the state of second position memory unit 134 is set by the pulse from second position bistable multivibrator 110, which occurs at the output when it is reset by the pulse from inverter 86, so that a reject indication is given by second position memory unit 134. If there is no defect, however, then the state of second position bistable multivibrator unit 110 is such that an output is coupled to second position memory unit 134 to set the state of this memory unit so that an output is supplied to AND gate 143.

If the information transferred from the first memory unit indicates a fault, however, then second position memory unit 134 will be set at the scan pulse from scan circuit 83 (which occurs after the inspection bistable multivibrator 56 pulse) to provide a fault indicating output to AND gate 142. If a no-fault condition is transferred from the first memory unit 115, the output is coupled through INHIBIT gate 119 when the delayed scan circuit pulse (from delayed scan circuit 84) occurs, to set the second position memory circuit 134 to provide an output to AND gate 143—unless a defect is sensed by second inspection photocell 14 to inhibit an output from INHIBIT gate 119.

When the article transfer again occurs, it is sensed by position photocell 12. In the third position, third inspection photocell 15 inspects the article for defects, and if a defect is sensed, it is coupled to second position memory unit 134 when the inspection bistable multivibrator 56 pulse occurs (since the output of this multivibrator is connected to AND gate 139 as is the output derived from photocell 15) to set the memory unit so that an output is provided to AND gate 142. If no defect is found, then there is no output from photocell 15 and the circuit is unaffected.

The information on second position memory unit 134, which is now cumulative as to all three inspection stages, is then sensed by providing a pulse to AND gates 142 and 143 from scan circuit 83. If an output is provided to AND gate 142 from second position memory unit 134, the reject delay circuit 146 receives an output from AND gate 142. If second position memory unit 134 provides an output to AND gate 143, however, then pass delay circuit 170 receives an output from gate 143. Thus, depending upon the path energized, the pass-reject mechanism will be positioned by reject solenoid 151 or pass solenoid 175 to cause the article to be rejected or passed.

While only three inspection positions are shown herein, it is to be appreciated that as many positions as desired can be utilized by adding circuitry comparable to that of the middle, or second position memory stage.

Thus, the system of this invention provides a heretofore unavailable electronic inspection means for cumulatively collecting fault information from a plurality of inspection positions and, in response to this information, causing ware to be passed if not defective and rejected if found to be defective.

What is claimed is:

1. An electronic inspection system for articles successively transferred to a plurality of inspection stations, said system comprising: first defect sensing means for sensing article defects at a first inspection station and producing an output signal indicative of article defect; at least one additional defect sensing means for sensing article defects at at least one subsequent inspection station and producing an output signal indicative of article defect; and electronic signal processing means including a plurality of cascaded electronic bistable means, position sensing means for sensing article transfer between inspection stations and providing an output signal indicative thereof, and timing means responsive to said output signal from said position sensing means for causing each said output signal from said defect sensing means to be shifted to the succeeding bistable means whenever article transfer occurs, said timing means causing transfer in a manner such that defect information is accumulated separately for each article inspected so that said electronic signal processing means produces a defect indicating output signal to reject an article if that article is sensed to be defective by any of said defect sensing means.

2. An electronic inspection system for articles successively transferred to a plurality of inspection stations, said system comprising: first defect sensing means for sensing article defects at a first inspection station and producing an output signal indicative of article defect; at least one additional defect sensing means for sensing article defects at at least one subsequent inspection station and producing an output signal indicative of article defect; and electronic signal processing means for receiving said output signals from said defect sensing means and accumulating the same separately for each article inspected, said electronic signal processing means including means for producing a defect indicating output signal to reject an article if that article is sensed to be defective by any of said defect sensing means, and means for producing a no-defect indicating output signal for passing an article if that article is sensed as being faultless by all of said defect sensing means.

3. An electronic inspection system for articles successively transferred to a plurality of inspection stations, said system comprising: first defect sensing means for sensing article defects at a first inspection station and producing an output signal indicative of article defect; second defect sensing means for sensing article defects at a second inspection station and producing an output signal indicative of article defect; a first bistable memory unit; position sensing means for sensing article transfer between inspection stations and producing an output signal in response thereto; gate means; timing means for receiving said output signal from said position sensing means and providing output signals to said gate means; means for receiving the output signal from said first defect sensing means and producing an output signal to said gate means reflecting defect information received from said first defect sensing means; said gate means controlling the state of said first bistable memory unit; a second bistable memory unit the state of which is controlled by said first bistable memory unit and said second defect sensing means so that an output indicating article defect is produced by said second bistable memory unit if either defect sensing means senses an article defect; and reject means connected to said second bistable memory unit and, responsive to an output indicating article defect therefrom, causing said defective article to be rejected.

4. An electronic inspection system for articles successively transferred to a plurality of inspection stations, said system comprising: first defect sensing means for sensing article defects at a first inspection station and producing an output signal indicative of article defect; second defect sensing means for sensing article defects at a second inspection station and producing an output signal indicative of article defect; bistable storage means; position sensing means for sensing article transfer between inspection stations and producing an output signal in response thereto; gate means for receiving output signals from said first defect sensing means and said position sensing means and providing an output to said bistable storage means to set the state thereof to produce an output indicating article defect if said first defect sensing means senses a defect; a bistable memory unit the state of which is controlled by said bistable storage means and said second defect sensing means so that an output indicating article defect is produced by said bistable memory unit if either defect sensing means senses an article defect and a pass output signal is produced if an article is found to be faultless by said defect sensing means; reject means connected to said bistable memory unit and, responsive to an output indicating article defect therefrom, causing said defective article to be rejected; and pass means connected to said bistable memory unit and, responsive to said pass output therefrom, causing said faultless article to be passed.

5. A control system for monitoring articles successively transferred to a plurality of different positions, said system comprising: a plurality of bistable storage means; electronic circuit means including a plurality of gate means for cascading said bistable storage means with both outputs being connected to the corresponding inputs of the succeeding said bistable storage means through separate circuits each of which includes one of said gate means; means for controlling the state of said first bistable storage means whereby information is stored in said first bistable storage means that is indicative of a sensed condition of a predetermined article being transferred; shifting means connected to said plurality of gate means for successively shifting stored information from one said bistable storage means to the adjacent said bistable storage means concurrently with article transfer between positions; and actuating means connected with the last of said cascaded bistable storage means operable after said predetermined article has been transferred to the last of said plurality of positions and in response to said last bistable means being in a predetermined one of said bistable states.

6. An electronic inspection system for articles successively transferred to a plurality of inspection stations, said system comprising: first defect sensing means for sensing article defects at a first inspection station and producing an ouput signal indicative of the presence of a defect; first bistable storage means the state of which is set by said output signal from said first defect sensing means to produce an output indicative of article defect; a first bistable memory unit the state of which is controlled by said first bistable storage means so that said output from said first bistable storage means causes said first bistable memory unit to assume a state such that an output is produced that is indicative of article defect; second defect sensing means for sensing article defects at a second inspection station and producing an output signal indicative of the presence of a defect; second bistable storage means the state of which is set by said output signal from said second defect sensing means to produce an output indicative of article defect; a second bistable memory unit the state of which is controlled by said second bistable storage means and said first bistable memory unit so that said second bistable memory unit assumes a state such that an output is produced that is indicative of article defect if a defect indicating signal is received from either said second bistable storage means or said first bistable memory unit; third defect sensing means for sensing article defects at a third inspection station and producing an output signal indicative of the presence of a defect, said output signal being coupled to said second bistable memory unit to cause said second bistable memory unit to produce an output indicative of article defect; and reject means connected to said second bistable memory unit and, responsive to an output indicative of article defect therefrom, causing said defective article to be rejected.

7. The electronic inspection system of claim 6 wherein said reject means includes a delay circuit, a pulse width control circuit, and a solenoid the energization of which actuates a reject mechanism.

8. An electronic inspection system for articles successively transferred to a plurality of inspection stations, said system comprising: a first photocell for sensing defects at a first inspection station and producing a pulse in response thereto; a first trigger circuit triggered by said pulse from said first photocell and producing an output pulse of predetermined width; a position photocell for sensing article transfer between stations and producing a pulse in response thereto; a position trigger circuit triggered by said pulse from said position photocell and producing an output pulse of predetermined width; a time delay monostable multivibrator triggered by said pulse from said position trigger circuit and producing an output pulse of predetermined width; an inspection bistable multivibrator connected to receive the output pulse from said time delay multivibrator and, in response thereto, producing an inspection output; a first AND gate for receiving the output pulse from said first trigger circuit and said inspection output from said inspection bistable multivibrator; a first bistable storage multivibrator connected to receive the output from said first AND gate, said first bistable storage multivibrator having two output terminals so that the output signal appears on the first terminal if an output is received from said first AND gate and on the second terminal if no output is received from said first AND gate; a second defect sensing photocell for sensing defects at a second inspection station and producing a pulse in response thereto; a second trigger circuit triggered by said pulse from said second photocell and producing an output pulse of predetermined width; a second AND gate for receiving the output pulse from said second trigger circuit and said inspection output from said inspection bistable multivibrator; a second bistable storage multivibrator connected to receive the output from said second AND gate, said second bistable storage multivibrator having two output terminals so that the output signal appears on the first terminal if an output is received from said second AND gate and on the second terminal if no output is received from said second AND gate; third and fourth AND gates connected to said first and second terminals of said first bistable storage multivibrator, respectively; an inspection time control circuit connected to receive the output from said position trigger circuit; a scan monostable multivibrator connected to receive the output from said inspection time control circuit and producing a shift pulse in response to an output pulse from said position trigger circuit; a delayed scan monostable multivibrator triggered by the trailing edge of the output pulse from said scan monostable multivibrator to produce a delayed shift pulse; an inverter; means for coupling said delayed shift pulse to said third and fourth AND gates and to said inverter; means for connecting the output of said inverter to said first and second bistable storage multivibrators to reset the same; a first bistable memory unit the inputs of which are separately connected to the outputs of said third and fourth AND gates so that when said delayed shift pulse occurs, said first bistable memory unit assumes the state of said first bistable storage multivibrator so that if a defect indicating output is produced it appears at the first output terminal; a fifth AND gate connected to said first output terminal of said first bistable memory unit and receiving said shift pulse at the other input; a second bistable memory unit a first input of which is connected to receive the output from said fifth AND gate; an INHIBIT gate connected to the other output terminal of said first bistable memory unit and receiving said delayed shift pulse at the second input, said INHIBIT gate receiving an inhibiting input from said first terminal of said second bistable storage multivibrator; means for connecting said second terminal of said second bistable storage multivibrator and the output of said INHIBIT gate to the other input of said second bistable memory unit; a third photocell for sensing defects at a third inspection station and producing a pulse in response thereto; a third trigger circuit triggered by said pulse from said third photocell and producing an output pulse of predetermined width, said pulse being coupled to said first terminal of said second bistable memory unit; sixth and seventh AND gates connected to the first and second output terminals of said second bistable memory unit, said AND gates receiving said shift pulse at the other input of said AND gates; a reject delay circuit connected to receive the output from said sixth AND gate; a reject solenoid energized by the output from said reject delay circuit; a pass delay circuit connected to receive the output from said seventh AND gate; and a pass solenoid energized by the output from said pass delay circuit.

References Cited
UNITED STATES PATENTS 3,289,832   12/1966   Ramsay.

ALLEN N. KNOWLES, *Primary Examiner.*